(12) United States Patent
Ferren et al.

(10) Patent No.: US 8,234,578 B2
(45) Date of Patent: Jul. 31, 2012

(54) NETWORKED GESTURE COLLABORATION SYSTEM

(75) Inventors: Bran Ferren, Beverly Hills, CA (US); H Keith Nishihara, Los Altos, CA (US)

(73) Assignee: Northrop Grumman Systems Corporatiom, Falls Church, VA (US)

( * ) Notice: Subject to any disclaimer, the term of this patent is extended or adjusted under 35 U.S.C. 154(b) by 799 days.

(21) Appl. No.: 11/492,571

(22) Filed: Jul. 25, 2006

(65) Prior Publication Data

US 2008/0028325 A1 Jan. 31, 2008

(51) Int. Cl.
*G06F 3/00* (2006.01)

(52) U.S. Cl. .................................. 715/753; 345/156

(58) Field of Classification Search .................. 715/753, 715/754, 863; 348/14.01, 14.02, 586, 587; 353/28, 30, 37; 345/156
See application file for complete search history.

(56) References Cited

U.S. PATENT DOCUMENTS

| | | | |
|---|---|---|---|
| 4,468,694 A * | 8/1984 | Edgar | 348/135 |
| 4,843,568 A * | 6/1989 | Krueger et al. | 382/100 |
| 4,924,506 A | 5/1990 | Crossley et al. | |
| 5,025,314 A * | 6/1991 | Tang et al. | 348/14.08 |
| 5,220,441 A | 6/1993 | Gerstenberger | |
| 5,239,373 A * | 8/1993 | Tang et al. | 348/14.01 |
| 5,475,422 A | 12/1995 | Mori et al. | |
| 5,483,261 A | 1/1996 | Yasutake | |
| 5,913,727 A | 6/1999 | Ahdoot | |
| 5,999,185 A | 12/1999 | Kato et al. | |
| 6,002,808 A | 12/1999 | Freeman | |
| 6,128,003 A | 10/2000 | Smith et al. | |
| 6,147,678 A | 11/2000 | Kumar et al. | |
| 6,195,104 B1 | 2/2001 | Lyons | |
| 6,204,852 B1 | 3/2001 | Kumar et al. | |
| 6,327,381 B1 * | 12/2001 | Rogina et al. | 382/154 |
| 6,353,428 B1 * | 3/2002 | Maggioni et al. | 345/157 |

(Continued)

FOREIGN PATENT DOCUMENTS

DE 197 39 285 C 1 11/1998

(Continued)

OTHER PUBLICATIONS

Sara A. Bly, Scott L. Minneman, Commune: A Shared Drawing Surface, 1990, ACM, vol. 11 , Issue 2-3 (Apr. 1990), pp. 187, 189.*

(Continued)

*Primary Examiner* — Chanh Nguyen
*Assistant Examiner* — Allison Walthall
(74) *Attorney, Agent, or Firm* — Tarolli, Sundheim, Covell & Tummino LLP

(57) ABSTRACT

A system and method is provided for a collaboration input/output (I/O) system. The collaboration I/O system may comprise a display screen and a gesture image system. The gesture image system may be configured to generate image data associated with a location and an orientation of a first sensorless input object relative to a background surface. The collaboration I/O system may also comprise a transceiver. The transceiver could be configured to transmit the image data to at least one additional collaboration I/O system at at least one remote location. The transceiver can be further configured to receive image data from each of the at least one additional collaboration I/O system, such that the display screen can be configured to display the image data associated with a location and orientation of a sensorless input object associated with each of the at least one additional collaboration I/O system superimposed over a common image of visual data.

22 Claims, 6 Drawing Sheets

U.S. PATENT DOCUMENTS

| | | | |
|---|---|---|---|
| 6,359,612 B1 | 3/2002 | Peter et al. | |
| 6,434,255 B1 | 8/2002 | Harakawa | |
| 6,512,507 B1* | 1/2003 | Furihata et al. | 345/157 |
| 6,624,833 B1 | 9/2003 | Kumar et al. | |
| 6,681,031 B2 | 1/2004 | Cohen et al. | |
| 6,695,770 B1 | 2/2004 | Choy et al. | |
| 6,714,901 B1 | 3/2004 | Cotin et al. | |
| 6,720,949 B1 | 4/2004 | Pryor et al. | |
| 6,788,809 B1 | 9/2004 | Grzeszczuk et al. | |
| 6,796,656 B1* | 9/2004 | Dadourian | 353/28 |
| 6,806,849 B2 | 10/2004 | Sullivan | |
| 6,857,746 B2 | 2/2005 | Dyner | |
| 6,950,534 B2 | 9/2005 | Cohen et al. | |
| 6,956,573 B1* | 10/2005 | Bergen et al. | 345/473 |
| 6,983,065 B1 | 1/2006 | Akgul et al. | |
| 7,042,440 B2 | 5/2006 | Pryor et al. | |
| 7,129,927 B2 | 10/2006 | Mattsson | |
| 7,259,747 B2 | 8/2007 | Bell | |
| 7,620,900 B2* | 11/2009 | Kawashima et al. | 715/754 |
| 7,701,439 B2 | 4/2010 | Hillis et al. | |
| 2001/0006426 A1 | 7/2001 | Son et al. | |
| 2001/0043719 A1 | 11/2001 | Harakawa et al. | |
| 2002/0030637 A1* | 3/2002 | Mann | 345/8 |
| 2002/0090146 A1 | 7/2002 | Heger et al. | |
| 2002/0093666 A1* | 7/2002 | Foote et al. | 356/621 |
| 2002/0122113 A1 | 9/2002 | Foote | |
| 2002/0126161 A1 | 9/2002 | Kuzunuki et al. | |
| 2002/0186221 A1 | 12/2002 | Bell | |
| 2003/0058341 A1 | 3/2003 | Brodsky et al. | |
| 2003/0067537 A1 | 4/2003 | Myers | |
| 2003/0085866 A1 | 5/2003 | Bimber et al. | |
| 2003/0156756 A1 | 8/2003 | Gokturk et al. | |
| 2003/0218761 A1 | 11/2003 | Tomasi et al. | |
| 2004/0046747 A1 | 3/2004 | Bustamante | |
| 2004/0108990 A1 | 6/2004 | Lieberman et al. | |
| 2004/0113885 A1 | 6/2004 | Genc et al. | |
| 2004/0125207 A1 | 7/2004 | Mittal et al. | |
| 2004/0183775 A1 | 9/2004 | Bell | |
| 2004/0190776 A1* | 9/2004 | Higaki et al. | 382/190 |
| 2004/0193413 A1 | 9/2004 | Wilson et al. | |
| 2004/0239761 A1 | 12/2004 | Jin et al. | |
| 2005/0002074 A1 | 1/2005 | McPheters et al. | |
| 2005/0012817 A1 | 1/2005 | Hampapur et al. | |
| 2005/0052714 A1 | 3/2005 | Klug et al. | |
| 2005/0068537 A1* | 3/2005 | Han et al. | 356/446 |
| 2005/0088714 A1 | 4/2005 | Kremen | |
| 2005/0110964 A1 | 5/2005 | Bell et al. | |
| 2005/0151850 A1 | 7/2005 | Ahn et al. | |
| 2005/0166163 A1 | 7/2005 | Chang et al. | |
| 2005/0275628 A1 | 12/2005 | Balakrishnan et al. | |
| 2005/0285945 A1 | 12/2005 | Usui et al. | |
| 2005/0286101 A1 | 12/2005 | Garner et al. | |
| 2006/0010400 A1 | 1/2006 | Dehlin et al. | |
| 2006/0036944 A1 | 2/2006 | Wilson | |
| 2006/0052953 A1 | 3/2006 | Vilanova et al. | |
| 2006/0092178 A1 | 5/2006 | Tanguay, Jr. | |
| 2006/0125799 A1 | 6/2006 | Hillis et al. | |
| 2006/0187196 A1 | 8/2006 | Underkoffler et al. | |
| 2006/0203363 A1 | 9/2006 | Levy-Rosenthal | |
| 2006/0209021 A1 | 9/2006 | Yoo et al. | |
| 2007/0024590 A1* | 2/2007 | Krepec | 345/173 |
| 2007/0064092 A1* | 3/2007 | Sandbeg et al. | 348/14.02 |
| 2008/0013826 A1 | 1/2008 | Hillis et al. | |
| 2008/0043106 A1 | 2/2008 | Hassapis et al. | |
| 2008/0150913 A1 | 6/2008 | Bell et al. | |
| 2008/0244468 A1 | 10/2008 | Nishihara et al. | |
| 2009/0015791 A1 | 1/2009 | Chang et al. | |
| 2009/0103780 A1 | 4/2009 | Nishihara et al. | |
| 2009/0115721 A1 | 5/2009 | Aull et al. | |
| 2009/0116742 A1 | 5/2009 | Nishihara | |
| 2009/0316952 A1 | 12/2009 | Ferren et al. | |
| 2010/0050133 A1 | 2/2010 | Nishihara et al. | |

FOREIGN PATENT DOCUMENTS

| | | |
|---|---|---|
| EP | 0 571 702 A2 | 12/1993 |
| EP | 0 571 702 A3 | 12/1993 |
| EP | 0 913 790 A1 | 5/1999 |
| EP | 1 223 537 A2 | 12/2001 |
| EP | 1 689 172 A1 | 8/2006 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/02187 A1 | 1/2000 |
| WO | WO 00/21023 A1 | 4/2000 |
| WO | WO 03/026299 A1 | 3/2003 |
| WO | WO 2008/001202 A3 | 1/2008 |

OTHER PUBLICATIONS

EP Search Report for corresponding EP 07 25 2870 completed Aug. 16, 2010 by Suphi Umut Naci of the Hague.

Bretzner, et al.: "Hand Gesture Recognition Using Multi-Scale Colour Features, Hierarchical Models and Particle Filtering"; Automatic Face and Gesture Recognition, 2002, Proceedings. Fifth IEEE International Conference on, IEEE, Piscataway, NJ, USA, May 20, 2002, pp. 423-428, XP010949393, ISBN: 978-0-7695-1602-8, p. 2.

British Search Report for corresponding GB 0909597.7 completed Sep. 17, 2009.

British Search Report for corresponding GB0910067.8, completed Oct. 15, 2009.

DE Office Action for corresponding DE 10 2009 043 798.3, issued Nov. 10, 2010.

Dubois, et al.: "In Vivo Measurement of Surgical Gestures"; IEEE Transactions on Biochemical Engineering, vol. 49, No. 1, Jan. 2002, pp. 49-54.

EP Search Report for corresponding EP 07 25 2716, completed Jun. 4, 2010, The Hague.

European Search Report for corresponding EP 07 25 2717 completed Sep. 27, 2007 by Martin Müller of the EPO.

Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.

German Office Action for corresponding DE 10 2009 034 413.6-53, issued Sep. 29, 2010.

Hartley, et al.: "Multiple View Geometry in Computer Vision, Structure Computation"; Jul. 31, 2000, Multiple View Geometry in Computer Vision, Cambridge University Press, GB, pp. 295-311, XP002521742, ISBN: 9780521623049, pp. 295-311, figures 11.1, 11.2 & 11.7.

Ishibuci, et al.: "Real Time Hand Gesture Recognition Using 3D Prediction Model"; Proceedings of the International Conference on Systems, Man and Cybernetics. Le Touquet, Oct. 17-20, 1993; New York, IEEE, US LNKD-DOI: 10.1109/ICSMC. 1993. 390870, vol. -, Oct. 17, 1993, pp. 324-328, XP010132504, ISBN: 978-0-7803-0911-1, pp. 325; figures 1-4.

Kjeldsen, et al.: "Toward the use of Gesture in Traditional User Interfaces"; Automatic Face and Gesture Recognition, 1996, Proceedings of the Second International Conference on Killington, VT, USA 14-16 19961014' Los Alamitos, CA, USA, IEEE Comput. Soc., ISBN 978-0-8186-7713-7; whole document.

Korida, K et al: "An Interactive 3D Interface for a Virtual Ceramic Art Work Environment"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.

Leibe, et al.: "Toward Spontaneous Interaction with the Perceptive Workbench"; IEEE Computer Graphics and Applications; p. 54-65XP-000969594; Nov./Dec. 2000.

Mitchell: "Virtual Mouse"; IP.COM Inc, West Henrietta, NY, US, May 1, 1992 ISSN 1533-0001; whole document.

Office Action for corresponding DE 10 2009 025 236.3, issued May 2010.

Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.

Pavlovic, et al.: "Visual Interpretation of Hand Gestures for Human-Computer Interaction: A Review"; Jul. 1, 1997, IEEE Transactions on Pattern Analysis and Machine Intelligence, IEEE Service Center, Los Alamitos, CA, US LNKD-DOI: 10.1109/34.598226, pp. 677-695, XP000698168, ISSN: 0162-8828, pp. 14-16, figure 5.

Plesniak, W et al.: "Spatial Interaction with Haptic Holograms"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.

Rehg: "Visual Analysis of High DOF Articulated Objects with Application to Hand Tracking"; [online] 1995, XP002585209, School of Computer Science Carnegie Mellon University, Retrieved from the internet: URL: http//www.dtoc/,o;/cgi-bin/GetTRDoc?AD=ADA306677&Location=U2&doc=GetRDoc.pdf> [retrieved on May 25, 2010], p. 1, 28, 31.

Sato, Y et al.: "Real-Time Input of 3D Pose and Gestures of a User's Hand and its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.

Search Report for corresponding British application No. GB0917797.3; completed Jan. 28, 2010 by Mr. Jeremy Cowen.

Search Report for corresponding GB 0715481.8, Date of Search: Nov. 27, 2007.

Search Report for corresponding GB 0913330.7; Completed Nov. 3, 2009 by Dr. Russell Maurice.

Sonka, et al.: "Image Processing, Analysis, and Machine Vision Second Edition"; Sep. 30, 1998, Thomson, XP002585208, ISBN: 053495393X, p. v-xii, p. 82-89.

Sutcliffe, et al.: "Presence, Memory and Interaction in Virtual Environments"; International Journal of Human-Computer Studies, 62 (2005), pp. 307-327.

Vámossy, et al.: "Virtual Hand—Hand Gesture Recognition System"; SISY 2007, 5th International Symposium on Intelligent Systems and Informatics, Aug. 24-25, 2007, Subolica, Serbia, IEEE, p. 97-102.

* cited by examiner

NETWORKED GESTURE COLLABORATION SYSTEM

CROSS REFERENCE TO RELATED APPLICATIONS

The present application is related to U.S. patent application Ser. No. 11/485,788 filed Jul. 13, 2006, entitled "Gesture Recognition Interface System," assigned to the same assignee as the present application and incorporated herein by reference in its entirety.

TECHNICAL FIELD

The present invention relates generally to network collaboration systems, and specifically to a networked gesture collaboration system.

BACKGROUND

As the range of activities accomplished with a computer increases, new and innovative ways to provide an interface with a computer are often developed to complement the changes in computer functionality and packaging. For example, advancements in computer networking, particularly with the speed at which information can be transferred between networked computers, allow multiple computer users at physically or geographically separate locations to collaborate regarding the same information at substantially the same time. These multiple computer users can communicate with one another via instant messaging, voice, and even video data. However, instant messaging, voice, and video data transfer in a network collaboration often requires large amounts of bandwidth. In addition, while collaboration regarding the same visual data can be accomplished via instant messaging, voice, and video data, collaboration requires input from several collaborators and repeated reference to the visual data. Thus, instant message, voice, and video transfer could require a lot of time and effort in describing to what a user is directing other users' attention regarding the collaborated visual data, and presentation can be limited by an amount of space available on a computer monitor when instant message and/or video transfer is also present.

Therefore, it is typically very difficult or even impossible to collaborate over a network in a way that accurate simulates a face-to-face conference room setting. Furthermore, despite a network collaboration allowing users to be geographically separated from one another, the individual locations of the users may still be limited only to locations that are suitable for network collaboration, such as a location that the user is capable of connecting to the appropriate network.

SUMMARY

One embodiment of the present invention includes a collaboration input/output (I/O) system. The collaboration I/O system may comprise a display screen and an image system. The gesture image system may be configured to generate image data associated with a location and an orientation of a first sensorless input object relative to a background surface. The collaboration I/O system may also comprise a transceiver. The transceiver could be configured to transmit the image data to at least one additional collaboration I/O system at at least one remote location. The transceiver can be further configured to receive image data from each of the at least one additional collaboration I/O system, such that the display screen can be configured to display the image data associated with a location and orientation of a sensorless input object associated with each of the at least one additional collaboration I/O system superimposed over a common image of visual data.

Another embodiment of the present invention includes a method for providing collaboration of visual data between a plurality of users, each of the plurality of users being located at a remote location separate from each other. The method comprises transmitting first image data associated with a sensorless input object of a first user of the plurality of users to each of the remaining plurality of users. The first image data can comprise location and orientation data of the sensorless input object of the first user relative to a display screen of the first user. The method may also comprise receiving second image data associated with a sensorless input object of each of the remaining plurality of users. The second image data can comprise location and orientation data of the sensorless input object of each of the remaining plurality of users relative to the visual data. The method can further comprise projecting an image of the visual data and the second image data onto the display screen of the first user. The second image data can be superimposed on the image of the visual data. The image of the visual data can be common to the plurality of users.

Another embodiment of the present invention includes a system for collaborating visual data with a first user and at least one additional user located at a remote location that is separate from the first user. The system can comprise means for generating first image data. The first image data can be associated with a location and an orientation of a sensorless input object of the first user relative to a background surface. The system can also comprise means for transmitting the first image data to the at least one additional user and for receiving second image data. The second image data can be associated with a location and an orientation of a sensorless input object of each of the at least one additional user. The system can also comprise means for combining the second image data with the visual data. The visual data can be common to both the first user and each of the at least one additional user. The system can further comprise means for displaying the second image data and the image of the visual data to the first user, such that the second image data is superimposed over the image of the visual data.

DETAILED DESCRIPTION

The present invention relates generally to network collaboration systems, and specifically to a networked gesture collaboration system. A plurality of users, each at locations that are physically separate from one another can collaborate over common visual data via respective collaboration input/output (I/O) systems. Each of the collaboration I/O systems can include a gesture image system that generates image data. The image data can correspond to location and orientation data of a sensorless input object for which the respective user provides gestures on the common visual data. As an example, the sensorless input object could merely be the respective user's hand. The location and orientation data of the sensorless input object could be relative to a background surface, which could be a display screen on which the common visual data image appears. The common visual data image could be projected onto the display screen, such that a local user can gesture directly at the visual data on the display screen to generate the image data. The image data can be transmitted to other collaboration I/O systems, and thus collaboration I/O systems can receive image data from the other collaboration I/O systems. The received image data is combined with the common visual data image. Therefore, the display screen displays silhouette images of all users' sensorless input object gestures superimposed over the common visual data image, thus allowing fast visual collaboration over the common visual data.

Figure 1:
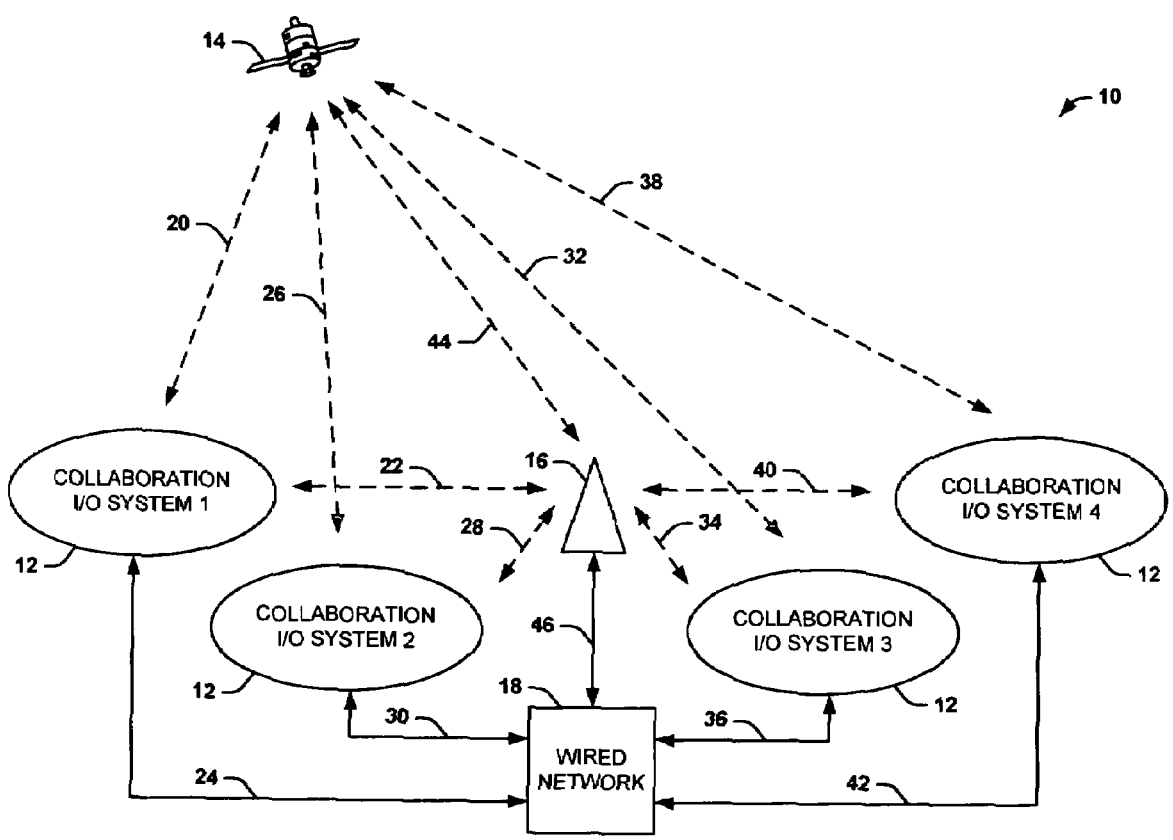
FIG. 1 illustrates an example of a networked gesture collaboration system in accordance with an aspect of the invention.

FIG. 1 illustrates an example of a networked gesture collaboration system 10. The networked gesture collaboration system 10 includes four separate collaboration I/O systems 12, demonstrated in the example of FIG. 1 as Collaboration I/O System 1, Collaboration I/O System 2, Collaboration I/O System 3, and Collaboration I/O System 4, respectively. Each of the collaboration I/O systems 12 can be located at regions that are geographically separate from each other. For example, the collaboration I/O systems 12 could be separately located anywhere from less than a mile from each other to being located on different continents.

Each of the collaboration I/O systems 12 can be communicatively coupled to a satellite 14, a base station 16, and/or a wired network 18. In the example of FIG. 1, the satellite 14 could be any of a variety of communication satellites, such as a geosynchronous satellite, a low-earth orbit satellite, and a medium-earth orbit satellite. In addition, although the example of FIG. 1 depicts a single satellite 14, the networked gesture collaboration system 10 can include any number of satellites 14. For example, in the event that Collaboration I/O System 1 and Collaboration I/O System 3 are located in regions on opposite hemispheres of the Earth, they may not both be able to communicate with a single satellite 14. Also, in the example of FIG. 1, the base station 16 could be a one or more cellular towers, such as in a Global System for Mobile Communications (GSM) wireless network. Furthermore, the wired network, in the example of FIG. 1, could be a local area network (LAN), or could be the Internet.

In the example of FIG. 1, Collaboration I/O System 1 is coupled to the satellite 14 via an uplink/downlink 20, to the base station 16 via a wireless link 22, and to the wired network 18 via a wired connection 24. Collaboration I/O System 2 is coupled to the satellite 14 via an uplink/downlink 26, to the base station 16 via a wireless link 28, and to the wired network 18 via a wired connection 30. Collaboration I/O System 3 is coupled to the satellite 14 via an uplink/downlink 32, to the base station 16 via a wireless link 34, and to the wired network 18 via a wired connection 36. Collaboration I/O System 4 is coupled to the satellite 14 via an uplink/downlink 38, to the base station 16 via a wireless link 40, and to the wired network 18 via a wired connection 42. In addition, the satellite 14 is coupled to the base station 16 via an uplink/downlink 44, and the base station 16 is coupled to the wired network 18 via a wired connection 46. Therefore, in the example of FIG. 1, the collaboration I/O systems 12 are each communicatively coupled to each other via any of a combination of the satellite 14, the base station 16, and the wired network 18. In such a way, users at each of the collaboration I/O systems 12 can collaborate about the same data with each other at substantially the same time.

It is to be understood that each of the collaboration I/O systems 12 may not be communicatively coupled to all three of the satellite 14, the base station 16, and the wired network 18. As an example, a given one of the collaboration I/O systems 12 may only have a satellite transceiver for communication with the satellite 14, or may have both a wireless transceiver and an RJ-45 jack for communication with both the base station 16 and the wired network 18. However, in the example of FIG. 1, regardless of the type of communication capabilities available to each of the collaboration I/O systems 12, all of the collaboration I/O systems 12 can be capable of substantially simultaneous networked collaboration.

The information sent from one of the collaboration I/O systems 12 to one or more of the other collaboration I/O systems 12 can include visual data, such as the visual data for which the respective users of each of the collaboration I/O systems 12 are collaborating. For example, a given one of the collaboration I/O systems 12 can be a master site, such that it transmits the visual data to each of the other collaboration I/O systems 12 for collaboration. Additionally, the information transmitted between the collaboration I/O systems 12 can include feedback and reference to the visual data. For example, a user of one of the collaboration I/O systems 12 can point to a certain portion of the visual data with a sensorless input object, such that image data associated with the sensorless input object can be generated and transmitted from the respective one of the collaboration I/O systems 12 to the other collaboration I/O systems 12 for the purpose of provoking discussion amongst the users. In addition, the image data can be combined with voice data, such that a face-to-face conference room setting can be simulated.

Figure 2:
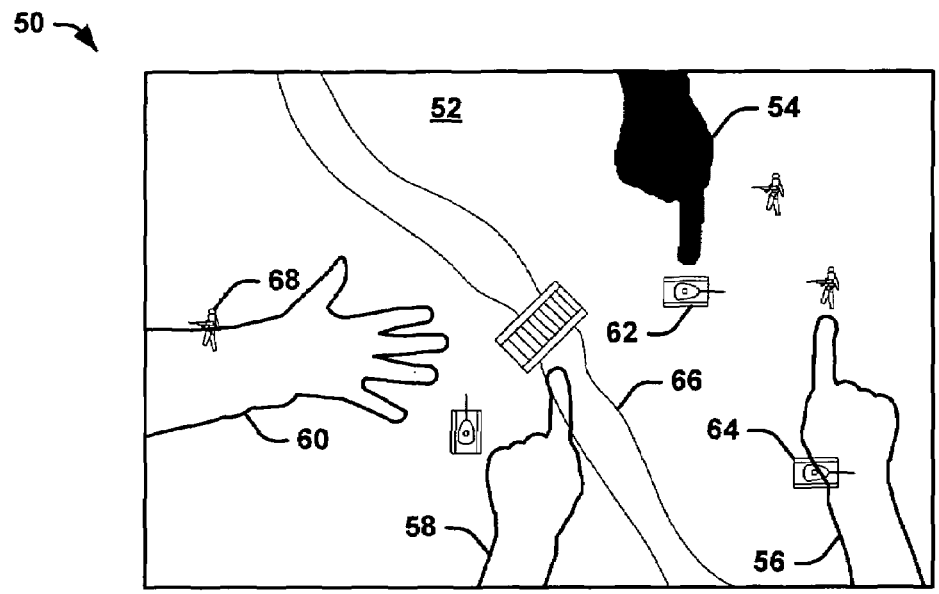
FIG. 2 illustrates an example of a gesture collaboration display in accordance with an aspect of the invention.

FIG. 2 illustrates an example of a gesture collaboration display 50 in accordance with an aspect of the invention. It is to be understood that, in the discussion of the example of FIG. 2, reference is made to FIG. 1, such that like reference numbers are used. The gesture collaboration display 50 could represent a display screen that is part of one of the collaboration I/O systems 12. The gesture collaboration display 50 includes visual data 52, demonstrated in the example of FIG. 2 as a battlefield display. It is to be understood, that the visual data 52 is not limited to the example of FIG. 2, and thus could be map data, video data, a still photograph, charts, graphs, or any of a variety of other types of visual data that can be displayed for collaboration.

In the example of FIG. 2, four separate users 54, 56, 58, and 60 each employ a sensorless input object to gesture in a collaborative effort. In the example of FIG. 2, the sensorless input object of each of the users 54, 56, 58, and 60 is the respective user's hand. However, the example of FIG. 2 is not intended to be limited to the use of hands as sensorless input objects, and thus any of a variety of sensorless input objects, such as a stylus, wand, or pointing stick, can be used to provide gestures in the collaborative effort. Each of the users 54, 56, 58, and 60 could be using separate collaboration I/O systems 12, such that each of the users 54, 56, 58, and 60 could be located at geographically separate regions. For example, the user 54 could be using Collaboration I/O System 1, the user 56 could be using Collaboration I/O System 2, the user 58 could be using Collaboration I/O System 3, and the user 60 could be using Collaboration I/O System 4. Despite each of the users 54, 56, 58, and 60 being located at separate collaboration I/O systems 12, each of them can be simultaneously viewing the same visual data 52 at their respective locations.

In the foregoing discussion, it is to be assumed that the gesture collaboration display 50 is located at Collaboration I/O System 1. In the example of FIG. 2, the hand of the user 54 is darkened to represent that the user 54 is physically present at Collaboration I/O System 1, such that the user 54 can be physically gesturing directly at the gesture collaboration display 50. As described above, however, the users 56, 58, and 60 are located at separate collaboration I/O systems 12. Thus, gestures that are made by each of the users 56, 58, and 60 with respect to the visual data 52 are captured by a gesture image system at their respective collaboration I/O systems 12 and transmitted to Collaboration I/O System 1. Therefore, the hands of the users 56, 58, and 60 appear in the example of FIG. 2 as silhouette images that are superimposed over the visual data 52 on the gesture collaboration display 50. In a likewise manner, the gestures that the user 54 makes on the gesture collaboration display 50, such as pointing to an armored unit 62, can be captured by a gesture image system (not shown) and transmitted to the users 56, 58, and 60. Accordingly, the users 56, 58, and 60 can view the gestures made by the user 54 at their respective collaboration I/O systems 12 as silhouette images superimposed over the visual data 52 on their respective gesture collaboration displays. In addition, as will be described in greater detail below, one or more of the users 54, 56, 58, and 60 in the networked gesture collaboration system 10 may be able to manipulate the visual data displayed on the gesture collaboration display 50 via gestures associated with a given sensorless input object.

The silhouette images can be semi-transparent, such that a given user can see both the silhouette image and the portion of the visual data 52 over which the silhouette image is superimposed. This is demonstrated in the example of FIG. 2 by the overlap of the hand of the user 56 with an armored unit 64, the overlap of the hand of the user 58 with a river 66, and the overlap of the hand of the user 60 with an infantry unit 68. In addition, the silhouette images of the hands of each of the users 56, 58, and 60 can be a separate color, such that each of the users 54, 56, 58, and 60 can identify to whom a given one of the hands belongs. Each silhouette image can also be optionally annotated with a textual identifier. The textural identifier can be displayed in the same color as the silhouette, and may be placed close to the border of the display near the silhouette so as not to be distracting to the remaining users. Furthermore, in the event that more than one user is located at a given one of the collaboration I/O systems 12, different colors can be assigned to the different users at the same collaboration I/O system 12, such as through a control input, a sensor, or though a gesture input, as demonstrated in greater detail in the examples of FIGS. 6-8 below.

As the image data transmitted between the users 54, 56, 58, and 60 is merely a set of pixels that is representative of the given sensorless input object, transmission bandwidth can be significantly reduced. As an example, the positional relationship between the visual data 52 and the given sensorless input object can be digitally compressed, for example, in a run-length encoding algorithm. Thus, only a small amount data is transmitted, such that it can be combined with the visual data 52 at the respective gesture collaboration display. Therefore, transmission delays can be greatly reduced, allowing for a more accurate and efficient collaboration between the users 54, 56, 58, and 60.

As described above, the image data that is transmitted between the users 54, 56, 58, and 60 can be combined with voice data. As such, the users 54, 56, 58, and 60 can collaborate from separate geographical locations more efficiently and effectively. For example, the user 54 can verbally communicate the importance of the armored unit 62 while simultaneously pointing to it. Therefore, because the user 54 gestures directly at the point of interest on the visual data 52, the users 56, 58, and 60 instantaneously and unequivocally know to what the user 54 is directing discussion. Accordingly, the user 54 need not waste time explaining to what objects on the visual data the user 54 is referring, or expend unnecessary bandwidth in transmitting video data through a web camera as a way of referring to objects of interest regarding the visual data. Therefore, the users 54, 56, 58, and 60 can collaborate in such a way as to simulate an actual face-to-face conference room setting.

Further to allowing a collaborative effort between the geographically separate users, one or more of the users 54, 56, 58, and 60 may be able to employ gestures to manipulate the visual data displayed on the gesture collaboration display 50. For example, the collaboration I/O system associated with the user 54 could be a gesture collaboration/interface system. The gesture collaboration/interface system may be able to interpret hand gestures made by the user 54 and translate the hand gestures into device inputs. The device inputs could include, for example, simulated mouse inputs. As an example, the user 54 could gesture with a pinching motion of the thumb and forefinger over the armored unit 62. The gesture collaboration/interface system could interpret the gesture and translate it to a left mouse-click, thus allowing the user 54 to "click and drag" the armored unit 62 across the collaboration display system 50. It is to be understood that a given gesture collaboration/interface system can be programmed to implement inputs such as zooming, panning, rotating, or any of a variety of gestures and corresponding simulated device inputs in such a manner. The other users 56, 58, and 60 may be able to view the simulated input as it occurs from their respective collaboration I/O systems, and also could possibly have similar visual data interaction capability. The operation of a gesture collaboration/interface system will be described in greater detail below in the example of FIG. 6.

It is to be understood that the gesture collaboration display 50 is not intended to be limited to the example of FIG. 2. For example, the gesture collaboration display 50, as part of the networked gesture collaboration system 10, is not limited to four users, but can include less or more than four users. In addition, the gesture collaboration display 50 can be simply a display, such that gestures made on the display by the user 54 are not transmitted to the other users 56, 58, and 60. Furthermore, any of a variety of other modifications can be made as dictated by the collaboration application.

Figure 3:
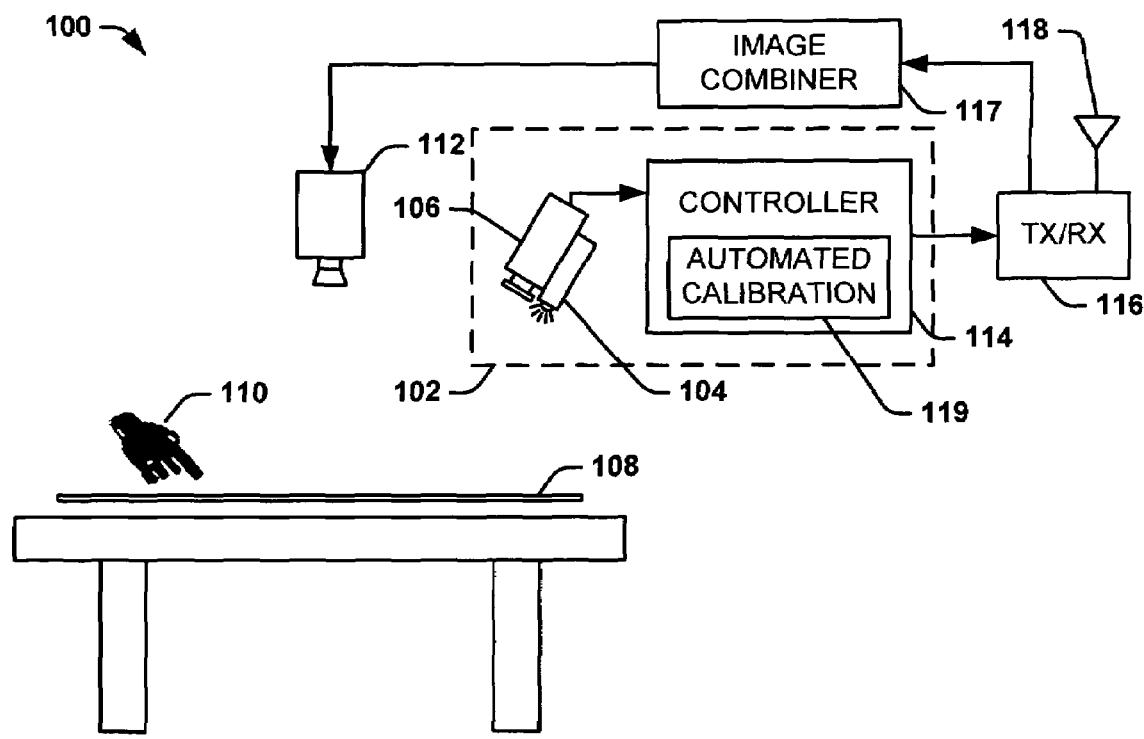
FIG. 3 illustrates an example of a collaboration input/output (I/O) system in accordance with an aspect of the invention.

FIG. 3 illustrates an example of a collaboration I/O system 100 in accordance with an aspect of the invention. The collaboration I/O system 100 includes a gesture image system 102. The gesture image system 102 includes an infrared (IR) light source 104 coupled to a camera 106. The camera 106 may include an IR filter, such that the camera may only be able to receive IR light. The IR light source 104 illuminates a retroreflective screen 108, such that IR light from the IR light source 104 is reflected substantially directly back to the camera 106. Accordingly, a sensorless input object 110 that is placed above the retroreflective screen 108 may reflect a significantly lesser amount of IR light back to the camera 106. Therefore, the sensorless input object 110 can appear to the camera 106 as a silhouette image, such that it can appear as a substantially darker object in the foreground of the highly illuminated retroreflective screen 108. It is to be understood that the retroreflective screen 108 may not be completely retroreflective, but may include a Lambertian factor to facilitate viewing by users at various angles relative to the retroreflective screen 108. The retroreflective and Lambertian properties of the retroreflective screen 108 can be balanced to provide a clearly visible display, as described in greater detail below, and to generate distinct silhouette images for detection by the IR camera 106.

In the example of FIG. 3, the sensorless input object 110 is demonstrated as a user's hand. However, as described above, it is to be understood that any of a variety of other types of sensorless input objects can be used, such as a stylus, wand, or pointing stick. It is to be further understood that the sensorless input object need not be specially designed or suited for use in the collaboration I/O system 100. For example, a user's naked hand could be used as the input object, and thus a user need not wear a glove that includes retroreflective material or one or more position sensors to provide gestures to the visual data in accordance with an aspect of the invention.

The collaboration I/O system 100 can include a projector 112. The projector 112 can provide an output interface to provide visual data, such as, for example, computer monitor data, for which the user can interact and provide collaborative gestures. The retroreflective screen 108 can thus be the display screen on which the visual data is projected. Therefore, the sensorless input object 110 can be used to provide gestures regarding the visual data directly on the visual data itself as it is being displayed on the retroreflective screen 108. Because the IR light source 104 does not illuminate visible light, the IR illumination does not interfere with the visual data projected from the projector 112.

The gesture image system 102 includes a controller 114. The controller 114 receives the image of the sensorless input object 110 captured by the camera 106 and converts the image into the image data. The image data can be a two-dimensional digital representation of the positional relationship between sensorless input object 110 and the retroreflective screen 108. The positional relationship can include, for example, information regarding a location and orientation of the sensorless input object relative to the retroreflective screen 108. As an example, the controller 114 can perform a run-length encoding digital compression algorithm on the image data, such that the amount of data of the image data is reduced.

The controller 114 is coupled to a transceiver 116, which can receive the image data from the controller 114 and transmit the image data to other collaboration I/O systems via an antenna 118. In addition to transmitting the image data to other collaboration I/O systems, the transceiver 116 can also receive image data from other collaboration I/O systems. The image data received can include digital data representative of a positional relationship of one or more other user's sensorless input objects relative to the same visual data. The collaboration I/O system 100 also includes an image combiner 117. The image combiner 117 is configured to combine the image data from the other collaboration I/O systems with the visual data. Thus, the projector 112 can project both the visual data and the image data of the other collaboration I/O systems, such that the image data is superimposed over the visual data. In addition, in a given networked collaboration system, one of the collaboration I/O systems may be a master site, such that the master site also transmits the common visual data to all of the other collaboration I/O systems. Alternatively, each of the collaboration I/O systems could separately launch or display the visual data.

To ensure that the image data accurately represents the positional relationship of the sensorless input object 110 relative to the retroreflective screen 108, and thus relative to the visual data itself, the gesture image system 102 can be calibrated. In the example of FIG. 3, the controller 114 can include an automated calibration unit 119. The operation of the automated calibration unit 119 is described in greater detail in the example of FIG. 4 below. The automated calibration unit 119 can be a separate system working in conjunction with the controller 114, or could merely be a software routine residing within the controller 114.

It is to be understood that the collaboration I/O system 100 is not intended to be limited to the example of FIG. 3. For example, instead of or in addition to the antenna 118, the transceiver could include a port to interface with a wired network, such as a LAN or the Internet, as described above in the example of FIG. 1. As another example, the projector 112, the gesture image system 102, and the transceiver 116 could all be included in an integrated package. As yet another example, the display screen upon which the projector 112 projects the visual data could be separate from the retroreflective screen 108. In this example, image data that is generated from the gesture image system 102, in addition to being transmitted to other collaboration I/O systems, can also be combined with the visual data at the collaboration I/O system 100, such that the user can view his or her own image data superimposed on the visual data on the display screen, along with the image data of other collaboration users.

Figure 4:
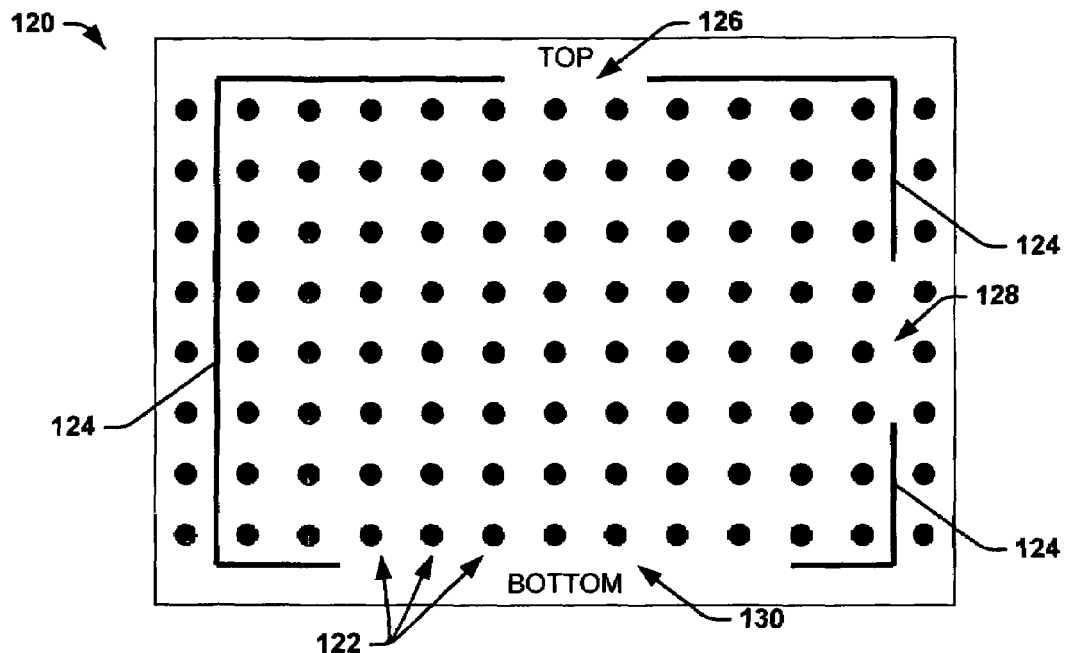
FIG. 4 illustrates an example of an automated calibration pattern for a collaboration I/O system in accordance with an aspect of the invention.

FIG. 4 illustrates an example of an automated calibration pattern 120 for the gesture collaboration/interface system 10 in accordance with an aspect of the invention. The automated calibration pattern 120 can be employed by the automated calibration unit 119 in the example of FIG. 3. Thus, it is to be understood that reference will be made to the collaborative I/O system 100 of FIG. 3, as well as the devices therein. However, the automated calibration pattern 120, as well as the accompanying calibration description below, is not intended to be limited to the gesture image system 102 in the example of FIG. 3.

The automated calibration pattern 120 includes a plurality of black dots 122 and a non-continuous border 124. The automated calibration pattern 120 can be, for example, printed on a retroreflective surface that can be placed underneath and illuminated by the IR light source 104. As another example, the retroreflective screen 108 in the example of FIG. 3 can be double-sided, such that the automated calibration pattern 120 is printed on the reverse side to allow a calibration operation simply by turning the retroreflective screen 108 over. The automated calibration pattern 120 can be used by the automated calibration unit 119 to initiate an automated software algorithm that performs a calibration to permit accurate operation of the gesture image system 102.

An example of an automated calibration procedure employing the automated calibration pattern 120 follows. The non-continuous border 124 includes a gap 126, a gap 128, and a gap 130. A user places the automated calibration pattern 120 in the viewing area of the camera 106 such that the automated calibration pattern 120 is oriented in a specific top-wise and left-wise arrangement. For example, the longer side of the non-continuous border 124 with the gap 126 can be designated a top side, as indicated in the example of FIG. 4, such that the shorter side of the non-continuous border 124 with no gap is a left side. The non-continuous border 124 can be used to set a boundary for the projector 112. For example, the projector 112 can be zoomed or otherwise adjusted such that the outer edge of the output projection is aligned with the non-continuous border 124. The automated calibration unit 119 and/or the controller 114 can be programmed to recognize the non-continuous border 124 and to identify the orientation of the non-continuous border 124 via the gaps 126, 128, and 130, such that the controller 114 can be calibrated to properly identify X-Y coordinate location on the retroreflective screen 108.

Upon setting the projection boundary of the projector 112 with the non-continuous border 124, the controller can then begin a calibration operation. Upon placing the automated calibration pattern 120 in view of the camera 106 and the IR light source 104, the automated calibration unit 119 could be programmed to simply begin a calibration operation after a given amount of time has passed without the detection of any motion. Alternatively, the automated calibration unit 119 could receive an input from a user to begin a calibration operation. The automated calibration unit 119 calibrates by detecting the position of the black dots 122 via the camera 106 relative to the boundaries of the retroreflective screen 108 or the projection boundaries. For example, the black dots 122 can be sized to be approximately the size of a fingertip in diameter (e.g., ½"), and can thus be tuned by the automated calibration unit 119 to be detected. Upon calibration, the controller 114 could be configured to issue a noise to signify that a calibration operation has been completed, such that the user can return the retroreflective screen 108 to the field of view of the camera 106, such as by turning it over, as described above.

It is to be understood that neither the automated calibration pattern 120 nor the manner in which a given gesture collaboration/interface system is calibrated are intended to be limited by the example of FIG. 4. For example, the automated calibration pattern 120, instead of being printed on a retroreflective background surface, could instead be projected by the projector 112 onto the retroreflective screen 108. As another example, although the automated calibration pattern 120 is illustrated as a series of black dots 122, the automated calibration pattern 120 could be any of a variety of patterns that are recognizable by the automated calibration unit 119. In addition, the automated calibration unit 119 may not calibrate automatically, but could have manual calibration capability instead of or in addition to automated calibration.

Figure 5:
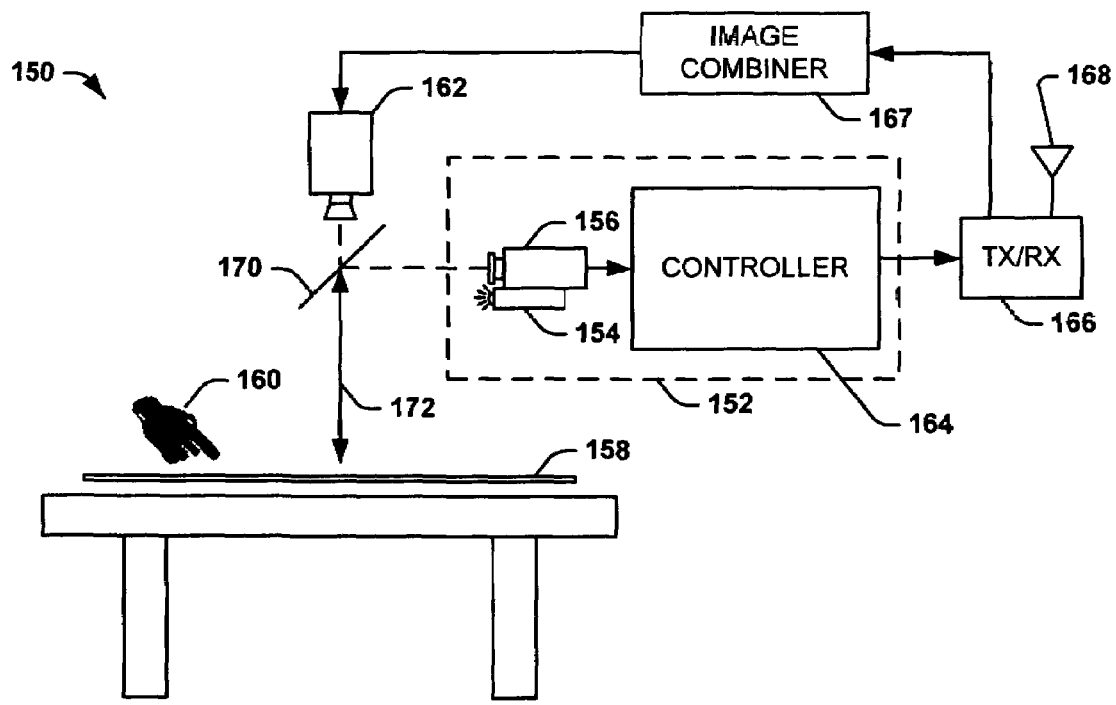
FIG. 5 illustrates another example of a collaboration I/O system in accordance with an aspect of the invention.

FIG. 5 illustrates an example of a collaboration I/O system 150 in accordance with an aspect of the invention. The collaboration I/O system 150 includes a gesture image system 152. Similar to the above example of FIG. 3, the gesture image system 152 includes an IR light source 154 coupled to an IR filtered camera 156. The IR light source 154 illuminates a retroreflective screen 158, such that gestures associated with a sensorless input object 160 placed above the retroreflective screen 158 can be captured by the camera 156 as silhouette images.

The collaboration I/O system 100 can include a projector 162. The projector 162 can provide an output interface to provide visual data, such as, for example, computer monitor data, for which the user can interact and provide collaborative gestures. The retroreflective screen 158 can thus be the display screen on which the visual data is projected. Therefore, the sensorless input object 160 can be used to provide gestures regarding the visual data directly on the visual data itself as it is being displayed on the retroreflective screen 158. Because the IR light source 154 does not illuminate visible light, the IR illumination does not interfere with the visual data projected from the projector 162.

The gesture image system 152 includes a controller 164. The controller 164 receives the image of the sensorless input object 160 captured by the camera 156 and converts the image into the image data. The image data can be a two-dimensional digital representation of the positional relationship between sensorless input object 160 and the retroreflective screen 158. The positional relationship can include, for example, information regarding a location and orientation of the sensorless input object relative to the retroreflective screen 158. As an example, the controller 164 can perform a run-length encoding digital compression algorithm on the image data, such that the amount of data of the image data is reduced.

The controller 164 is coupled to a transceiver 166, which can receive the image data from the controller 164 and transmit the image data to other collaboration I/O systems via an antenna 168. In addition to transmitting the image data to other collaboration I/O systems, the transceiver 166 can also receive image data from other collaboration I/O systems, such as digital data representative of a positional relationship of one or more other user's sensorless input objects relative to the same visual data. The collaboration I/O system 150 also includes an image combiner 167. The image combiner 167 is configured to combine the image data from the other collaboration I/O systems with the visual data. Thus, the projector 162 can project both the visual data and the image data of the other collaboration I/O systems, such that the image data is superimposed over the visual data. In addition, in a given networked collaboration system, one of the collaboration I/O systems may be a master site, such that the master site also transmits the common visual data to all of the other collaboration I/O systems.

The collaboration I/O system 150 also includes a beamsplitter 170. The beamsplitter 170, in the example of FIG. 5, can be a half-silvered mirror that is configured at approximately a 45 degree angle. As demonstrated in the example of FIG. 5, light output from the projector 162 can pass through the beamsplitter 170 onto the retroreflective screen 158. In addition, IR illumination output from the IR light source 154, as well as IR illumination input to the camera 156, is reflected between the retroreflective screen 158 and the respective IR light source 154 and camera 156. Therefore, the projector 162 and the combined IR light source 154 and camera 156 can be boresighted together, such that light illuminating to or from the retroreflective screen 158 can be substantially coaxial, as indicated at 172. Accordingly, calibration steps associated with the gesture image system 152 can be reduced or even eliminated. It is to be understood that the beamsplitter 170 may be any of a variety of types of beamsplitters, and is thus not limited to the half-silvered mirror demonstrated in the example of FIG. 5.

It is to be understood that the collaboration I/O system 150 is not intended to be limited to the example of FIG. 5. For example, instead of or in addition to the antenna 168, the transceiver could include a port to interface with a wired network, such as a LAN or the Internet, as described above in the example of FIG. 1. As another example, the projector 162, the gesture image system 152, the transceiver 166, and the beamsplitter 170 could all be included in an integrated package.

Figure 6:
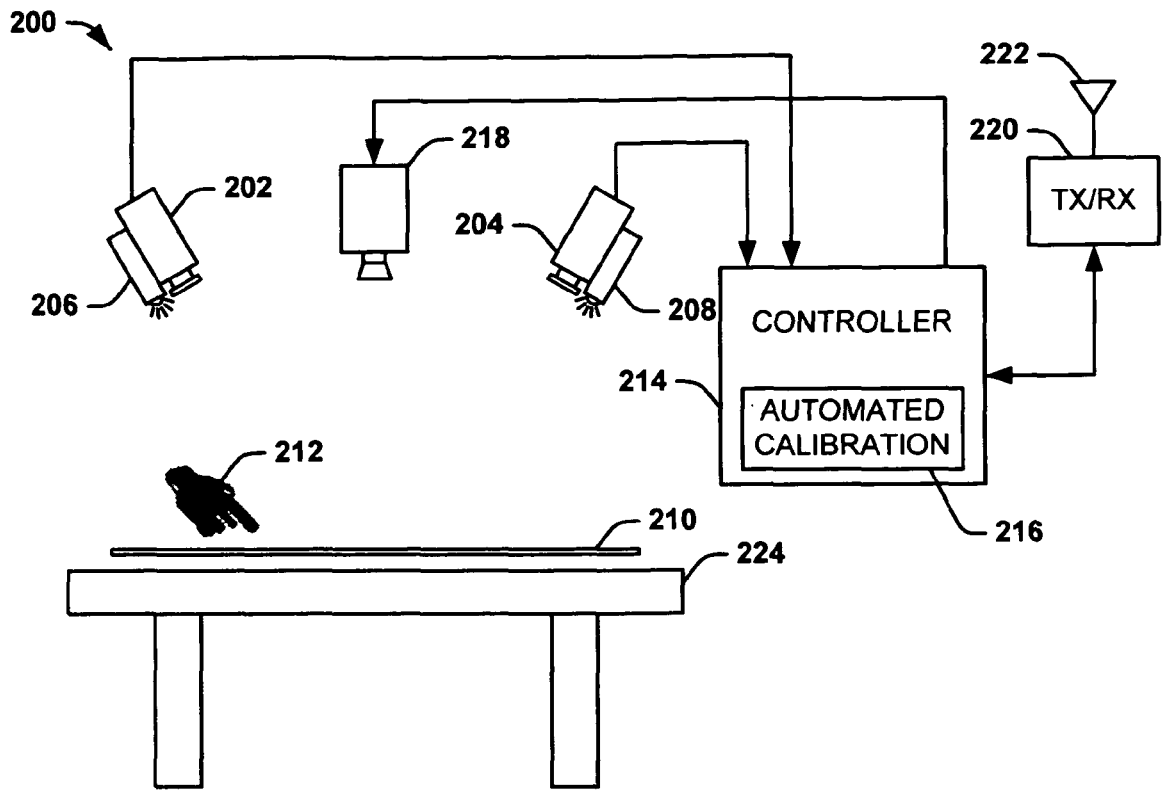
FIG. 6 illustrates an example of a gesture collaboration/interface system in accordance with an aspect of the invention.

In addition to providing gestures for the purpose of collaboration with other users at geographically separate locations, gestures can also be used to provide device inputs in a collaborative environment. FIG. 6 illustrates an example of a gesture collaboration/interface system 200 that can be used, for example, in the networked gesture collaboration system 10 in the example of FIG. 1 in accordance with an aspect of the invention. The gesture collaboration/interface system 200 includes a first camera 202 and a second camera 204. Coupled to each of the first camera 202 and the second camera 204, respectively, is a first IR light source 206 and a second IR light source 208. The first camera 202 and the second camera 204 may each include an IR filter, such that the respective camera may only be able to receive IR light.

The first IR light source 206 and the second IR light source 208 each illuminate a retroreflective screen 210, such that IR light from the first IR light source 206 is reflected substantially directly back to the first camera 202 and IR light from the second IR light source 208 is reflected substantially directly back to the second camera 204. Accordingly, an object that is placed above the retroreflective screen 210 may reflect a significantly lesser amount of IR light back to each of the first camera 202 and the second camera 204, respectively. Therefore, such an object can appear to each of the first camera 202 and the second camera 204 as a silhouette image, such that it can appear as a substantially darker object in the foreground of a highly illuminated background surface. It is to be understood that the retroreflective screen 210 may not be completely retroreflective, but may include a Lambertian factor to facilitate viewing by users at various angles relative to the retroreflective screen 210.

A sensorless input object 212 can provide gesture inputs over the retroreflective screen 210. In the example of FIG. 6, the sensorless input object 212 is demonstrated as a user's hand, such that the gesture inputs can be provided through hand gestures. It is to be understood that the use of a hand to provide gesture inputs via hand gestures is but one example implementation of the gesture collaboration/interface system 200. Examples of other types of input objects could include a stylus, wand, pointing stick, or any of a variety of devices that could provide gestures to simulate inputs. It is to be further understood that the input object need not be specially designed or suited for use in the gesture collaboration/interface system 200. For example, a user's naked hand could be used as the sensorless input object 212, and thus a user need not wear a glove that includes retroreflective material or one or more position sensors to provide gesture inputs to the gesture collaboration/interface system 200 in accordance with an aspect of the invention.

In the example of FIG. 6, the first camera 202 and the second camera 204 each receive separate silhouette images of the sensorless input object 212, where each of the separate silhouette images received, respectively, by the first camera 202 and the second camera 204 are a matched pair. For example, each of the first camera 202 and the second camera 204 could rapidly take still photograph images at, for example, sixty times per second, such that each still photograph image taken by the first camera 202 is matched to a still photograph image taken by the second camera 204 at substantially the same time. The input object can appear to be in a different location relative to the retroreflective screen in each silhouette image matched pair captured by each of the first camera 202 and the second camera 204, respectively, due to parallax caused by the different mounted locations of each of the first camera 202 and the second camera 204.

The first camera 202 and the second camera 204 can each provide their respective separate silhouette images of the sensorless input object 212 to a controller 214. The controller 214 could reside, for example, within a computer (not shown) for which the gesture collaboration/interface system 200 is designed to provide a gesture collaboration/interface. It is to be understood, however, that the hosting of a controller is not limited to a standalone computer, but could be included in embedded processors. The controller 214 can process the respective silhouette images associated with the sensorless input object 212 to generate three-dimensional location data associated with the sensorless input object 212.

For example, each of the first camera 202 and the second camera 204 could be mounted at a pre-determined angle relative to the retroreflective screen 210. For a given matched pair of images of the sensorless input object 212, if the pre-determined angle of each of the cameras 202 and 204 is equal, then each point of the sensorless input object 212 in two-dimensional space in a given image from the camera 202 is equidistant from a corresponding point of the sensorless input object 212 in the respective matched image from the camera 204. As such, the controller 214 could determine the three-dimensional physical location of the sensorless input object 212 based on a relative parallax separation of the matched pair of images of the sensorless input object 212 at a given time.

In addition, using a computer algorithm, the controller 214 could also determine the three-dimensional physical location of at least one end-point, such as a fingertip, associated with the sensorless input object 212, as will be described in greater detail in the example of FIG. 8 below. Furthermore, the controller 214 can include an automated calibration unit 216, the operation of which can be similar to that described above in the example of FIG. 4. The automated calibration unit 216 could be a separate system working in conjunction with the controller 214, or could merely be a software routine residing within the controller 214.

The gesture collaboration/interface system 200 can also include a projector 218. The projector 218 can provide an output interface, such as, for example, visual data, for which the user can interact and provide inputs. The visual data can be visual data for which other users in geographically separate locations can collaborate from respective collaboration I/O systems, or from other gesture collaboration/interface systems. In the example of FIG. 6, the projector 218 can project the visual data onto the retroreflective screen 210. Because the IR light sources 206 and 208 do not illuminate visible light, the IR illumination does not interfere with the visual data projected from the projector 218. The user can thus employ the sensorless input object 212 directly onto the visual data to simulate device inputs, such as, for example, mouse inputs.

As an example, the controller 214 could interpret two-dimensional motion of an end-point of the sensorless input object 212 across the retroreflective screen 210 as a mouse cursor, which can be projected as part of the visual data by the projector 218. Furthermore, as another example, by determining the three-dimensional physical location of the end-point of the sensorless input object 212, the controller 214 could interpret a touch of the retroreflective screen 210 by the end-point of the sensorless input object 212 as a left mouse-click. Accordingly, a user of the gesture collaboration/interface system 200 could navigate through a number of computer menus associated with a computer merely by moving his or her fingertip through the air above the retroreflective screen 210 and by touching icons projected onto the retroreflective screen 210, and can move displayed objects on the retroreflective screen 210 in a similar manner.

The controller 214 is coupled to a transceiver 220, which can receive the image data from the controller 214 and transmit the image data to other collaboration I/O systems and/or other gesture collaboration/interface systems via an antenna 222. In addition to transmitting the image data to other collaboration I/O systems, the transceiver 220 can also receive image data from other collaboration I/O systems and/or other gesture collaboration/interface systems. The image data received can include digital data representative of a positional relationship of one or more other user's sensorless input objects relative to the same visual data. The image data from the other collaboration I/O systems can be combined with the visual data. Thus, the projector 218 can project both the visual data and the image data of the other collaboration I/O systems, such that the image data is superimposed over the visual data.

In addition, in a given networked collaboration system, one of the collaboration I/O systems and/or other gesture collaboration/interface systems may be a master site, such that the master site also transmits the common visual data to all of the other collaboration I/O systems and/or other gesture collaboration/interface systems. Alternatively, each of the collaboration I/O systems and/or other gesture collaboration/interface systems could separately launch or display the visual data. Furthermore, a gesture collaboration system that includes more than one gesture collaboration/interface system can be configured such that any of the gesture collaboration/interface systems can provide device inputs regarding the visual data at a given time. Alternatively, the gesture collaboration system can be configured to allow device inputs regarding the visual data from only one gesture collaboration/interface system at a time.

As will be apparent in the following discussion, the gesture collaboration/interface system 200 in the example of FIG. 6 is intended to represent but one example of a gesture collaboration/interface system in accordance with an aspect of the invention. For example, the gesture collaboration/interface system 200 could include more than two cameras that each supply respective silhouette images of the sensorless input object 212 to the controller 214. In addition, the example of FIG. 6 demonstrates that the retroreflective screen 210 is mounted on a table 224. It is to be understood that such an arrangement is demonstrated only for the sake of ergonomic concerns, but that the retroreflective screen 210 can be placed in a variety of different arrangements for each of the cameras 202 and 204 to be capable of receiving the respective silhouette images of the sensorless input object 212. In addition, as another example, the table 224 could mount the projector 218 underneath, such that the retroreflective screen 210 displays rear-projected visual data. As a further example, the IR light sources 206 and 208 may not illuminate in the IR spectrum, but could instead illuminate in a different spectrum, such as narrow frequency bands of visible light, with each of the respective cameras 202 and 204 having a corresponding spectrum filter. In the example of the retroreflective screen 210 displaying a rear-projection, the light sources 206 and 208 could even illuminate visible light without impracticality.

Figure 7:
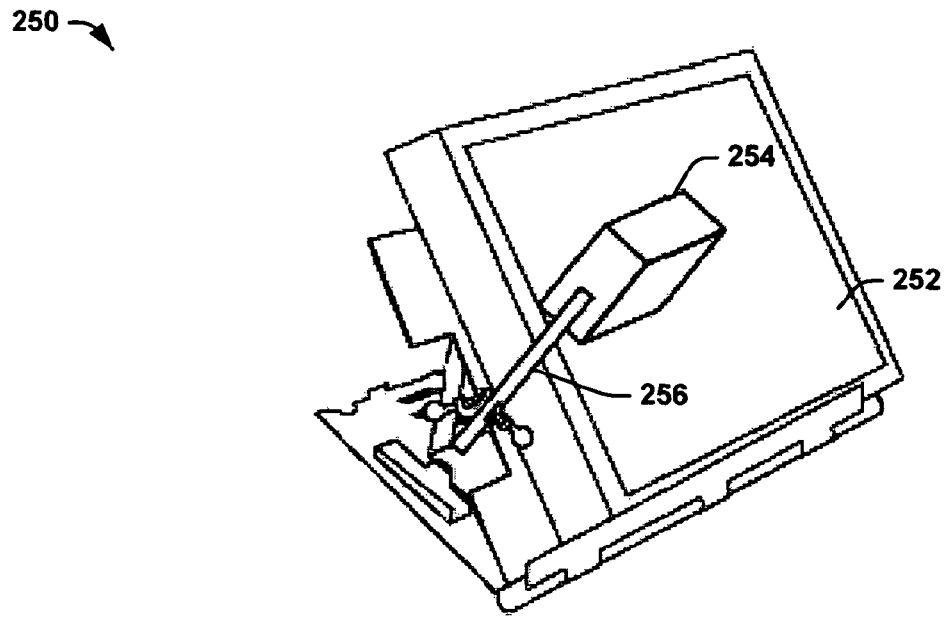
FIG. 7 illustrates an example of a portable collaboration I/O system in accordance with an aspect of the invention.

FIG. 7 illustrates an example of a portable collaboration I/O system 250 in accordance with an aspect of the invention. The portable collaboration I/O system 250 is demonstrated in the example of FIG. 7 as a desk-mounted portable collaboration I/O system. The portable collaboration I/O system 250 includes a retroreflective screen 252 and a gesture image system 254. The gesture image system 254 is mounted on a swivel arm 256 that can be adjusted and locked into place. The gesture image system 254 can include a camera and an IR light source, such that gesture images associated with a sensorless input object, such as a hand, can be captured and converted into image data.

The portable collaboration I/O system 250 can be collapsible, such that it can fit in a carrying case or brief case. In addition, the portable collaboration I/O system 250 can be configured as a self-contained, standalone unit. For example, the swivel arm 256 can also include a projector, such that collaborative visual data can be projected onto the retroreflective screen 252. The portable collaborative I/O system 250 can include an integral transceiver, such as a Wi-Fi connection, or it can include a receptacle for a plug-in device with communication capability, such as a cellular phone. As an alternative, the portable collaboration I/O system 250 can connect to a personal computer, such as through a USB or other connection, such that the user merely provides the collaboration gestures over the retroreflective screen while the visual data, including the user's own image data, appears on the computer monitor.

Figure 8:
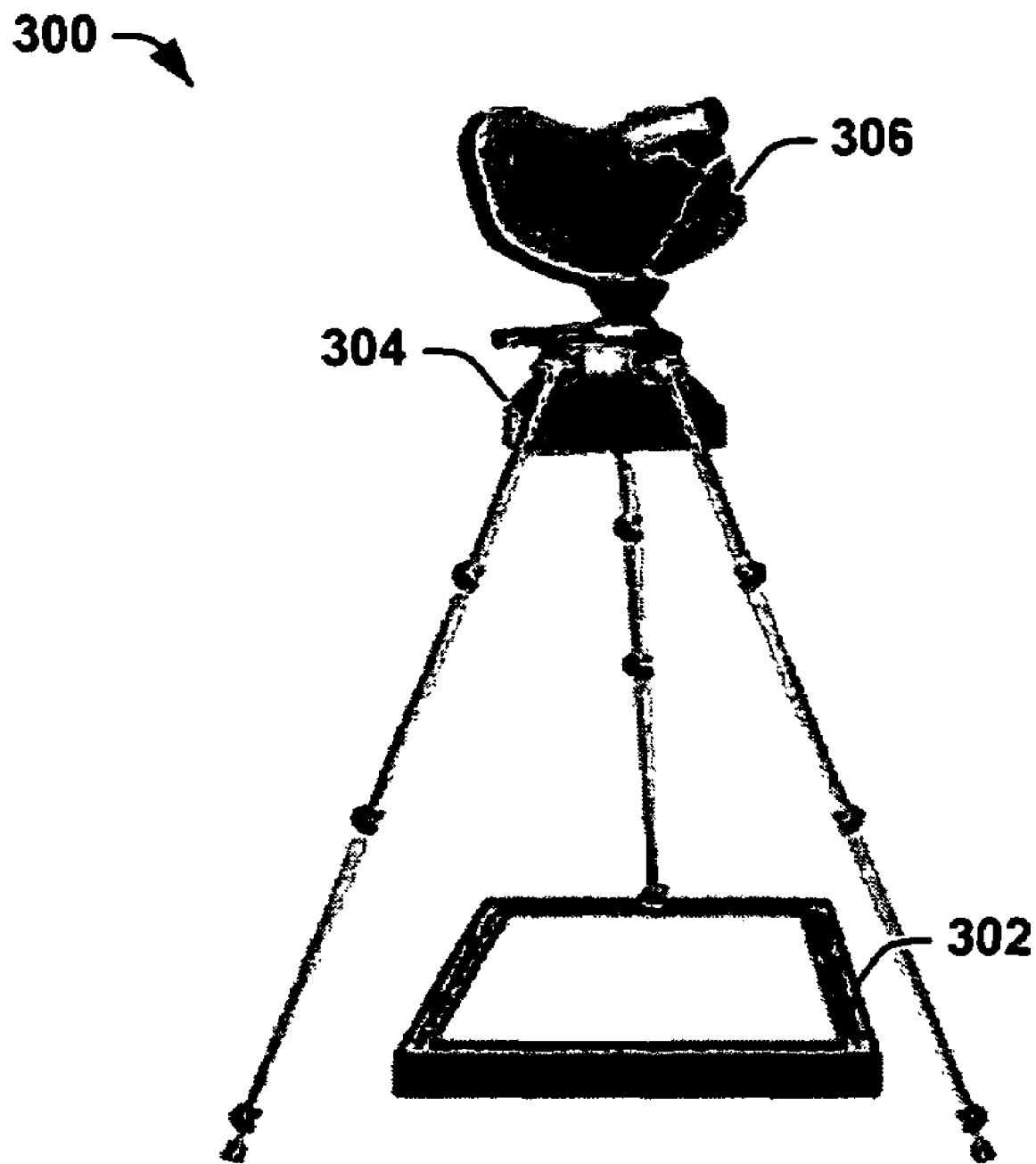
FIG. 8 illustrates another example of a portable collaboration I/O system in accordance with an aspect of the invention.

FIG. 8 illustrates another example of a portable collaboration I/O system 300 in accordance with an aspect of the invention. The portable collaboration I/O system 300 is demonstrated in the example of FIG. 8 as a tripod-mounted portable collaboration I/O system. The portable collaboration I/O system 300 includes a retroreflective screen 302 and a gesture image system 304. The gesture image system 304 can include a camera and an IR light source, such that gesture images associated with a sensorless input object, such as a hand, can be captured and converted into image data. The gesture image system 304 is mounted directly above the retroreflective screen 302, such that it can include a projector from which visual data can be projected onto the retroreflective screen 302. In addition, the portable collaboration I/O system includes an antenna 306, which could be for communication with a satellite.

The portable collaboration I/O system 300 can be collapsible, such that it can fit in a carrying case. As such, the portable collaboration I/O system 300 can be configured as a self-contained, standalone unit. For example, the portable collaboration I/O system 300 can be transported to remote locations to allow collaboration in an environment that is not well suited for the use of a portable computer, such as in a jungle, at sea, or on a mountain.

It is to be understood that the portable collaboration I/O systems described in the examples of FIGS. 7 and 8 are not intended to be limited to those respective examples. As such, other types of portable systems can implement the collaboration I/O system architecture, such as described above in the example of FIG. 3.

Figure 9:
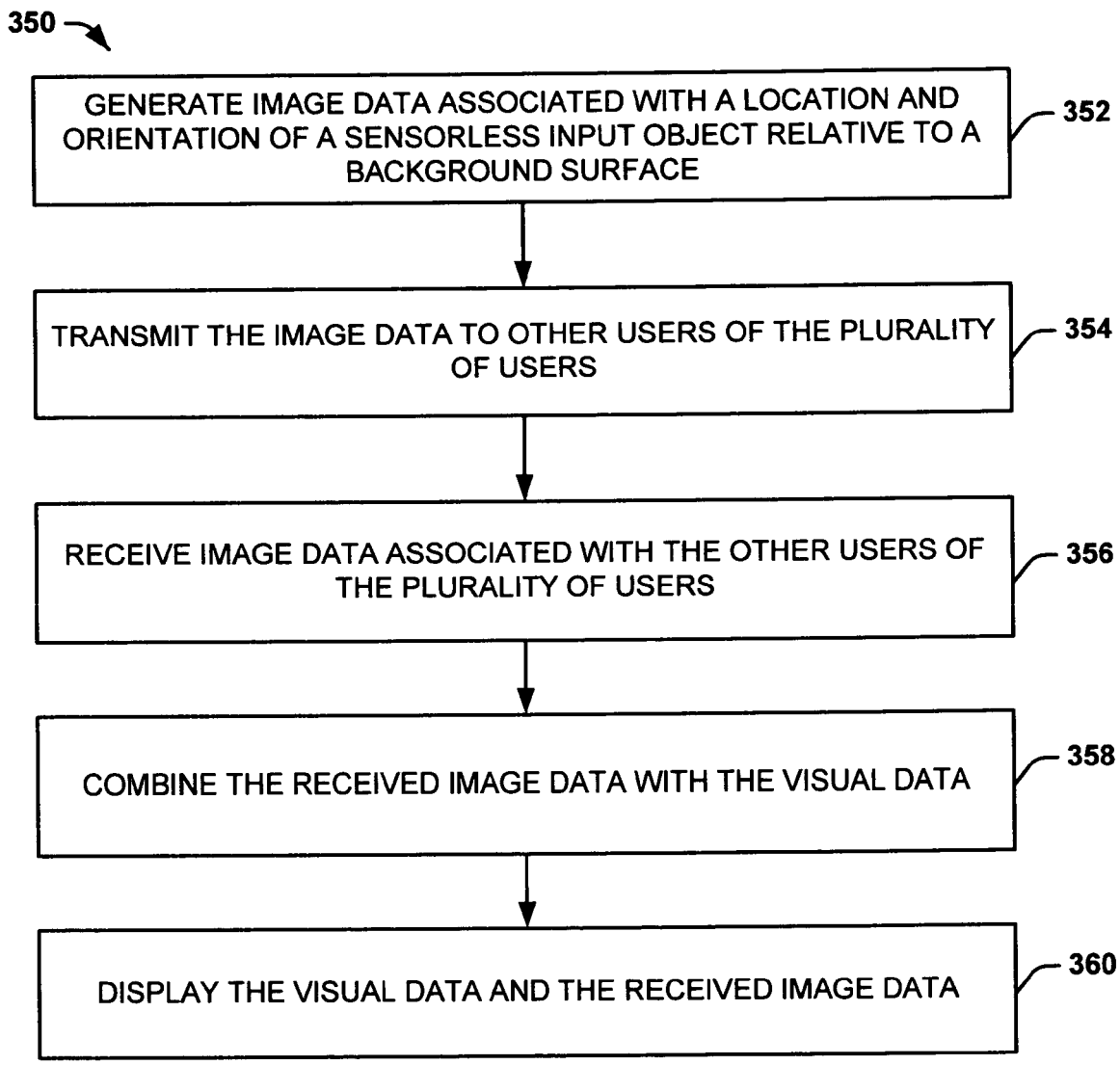
FIG. 9 illustrates an example of a method for providing collaboration of visual data between a plurality of remotely separated users in accordance with an aspect of the invention.

In view of the foregoing structural and functional features described above, a methodology in accordance with various aspects of the present invention will be better appreciated with reference to FIG. 9. While, for purposes of simplicity of explanation, the methodologies of FIG. 9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 9 illustrates an example of a method 350 for providing collaboration of visual data between a plurality of remotely separated users in accordance with an aspect of the invention. At 352, image data associated with a location and orientation of a sensorless input object relative to a background surface is generated. The sensorless input object could be a user's hand. The background surface could be a retroreflective surface that reflects IR illumination back to an IR filtered camera, and could further be a display screen on which the visual data is projected. At 354, the image data is transmitted to the other users of the plurality of users. The image data can be wireless transmitted, such as to a base station or to a satellite, can be transmitted through a wired network, such as the Internet or a LAN, or it can be transmitted through a combination of both.

At 356, image data associated with the other users of the plurality of users is received. The image data associated with the other users of the plurality of users can be data associated with a location and orientation of sensorless input objects relative to the visual data. The image data from each respective other user can be color coded to correspond to the specific other user. At 358, the visual data and the image data of the other users is combined. The combination could be such that the image data of the other users is superimposed over the visual data. At 360, the visual data and the image data of the other users is displayed. The display could be a projection onto the display screen from a projector.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A collaboration input/output (I/O) system comprising:
    a retroreflective display screen;
    an image system comprising at least one infrared (IR) filtered camera and at least one IR light source coupled to the respective at least one IR filtered camera and being configured to obtain silhouette images of a first sensorless input object to generate image data associated with a location and an orientation of the first sensorless input object relative to the retroreflective display screen;
    a transceiver configured to transmit the image data to at least one additional collaboration I/O system at least one remote location, and further configured to receive image data from each of the at least one additional collaboration I/O system, such that the display screen is configured to display the image data associated with a location and orientation of a sensorless input object associated with each of the at least one additional collaboration I/O system superimposed over a common image of visual data;
    a projector configured to project both the common image of visual data and the image data of the sensorless input object associated with each of the at least one additional collaboration I/O system onto the retroreflective display screen; and
    a beamsplitter configured to coaxially combine an input of the at least one IR filtered camera with an output of the respective at least one IR light source and an output of the projector.

2. The system of claim 1, wherein at least one of the first sensorless input object and the sensorless input object associated with each of the at least one additional collaboration I/O system comprises a hand associated with at least one user.

3. The system of claim 1, wherein the image data displayed on the retroreflective display screen comprises a semi-transparent silhouette image of the sensorless input object associated with each of the at least one additional collaboration I/O system superimposed on the common image of visual data, the semi-transparent silhouette image being a distinct color that corresponds to the respective one of the at least one additional collaboration I/O system.

4. The system of claim 3, wherein the semi-transparent silhouette image of at least one additional user that is co-located at the collaboration I/O system has a distinct color relative to a first user of the collaboration I/O system.

5. The system of claim 1, wherein the image system further comprises an automatic calibration unit configured to automatically calibrate the image system based on the light source coupled to the at least one IR filtered camera upon placing a predetermined pattern on the display screen.

6. The system of claim 1, wherein the image system is further configured to translate gesture inputs associated with three-dimensional motion of the first sensorless input object relative to the retroreflective display screen into device control inputs.

7. The system of claim 6, wherein the device control inputs comprises manipulation of the visual data based on respective gesture inputs that comprise movement of at least one digit of a user's hand.

8. The system of claim 1, wherein the transceiver is communicatively coupled to one of a wired network and a wireless network.

9. The system of claim 1, wherein the transceiver receives the image data from the at least one additional collaboration I/O system via a satellite.

10. The system of claim 1, wherein the collaboration I/O system is self-contained, collapsible, and portable.

11. The system of claim 1, wherein the at least one additional collaboration I/O system comprises a plurality of additional collaboration I/O systems, and wherein the collaboration I/O system is a master site that transmits the visual data to each of the plurality of additional I/O systems for collaboration.

12. The system of claim 1, wherein the image data associated with the location and orientation of the sensorless input object associated with each of the at least one additional collaboration I/O system is annotated with a textual identifier that corresponds to a respective one of at least one additional user.

13. The system of claim 1, wherein the image data comprises a positional relationship between the visual data and the sensorless input object is digitally compressed in a run-length encoding algorithm for transmission of the image data to the at least one additional collaboration I/O system.

14. The system of claim 1, wherein the gesture inputs comprise at least one of clicking-and-dragging, zooming, panning, and rotating at least a portion of the visual data based on three-dimensional motion of the sensorless input object.

15. A method for providing collaboration of visual data between a plurality of users, each of the plurality of users being located at a remote location separate from each other, the method comprising:
    illuminating a retroreflective display screen of a first user with an infrared (IR) light source and capturing first image data comprising a silhouette image of a sensorless input object of the first user with an IR filtered camera, the IR light source being coupled to the IR filtered camera and the silhouette image being based on a reflected light contrast difference between the display screen and the sensorless input object;
    transmitting first image data associated with a sensorless input object of a first user of the plurality of users to each of the remaining plurality of users, the first image data comprising location and orientation data of the sensorless input object of the first user relative to the retroreflective display screen of the first user;
    receiving second image data associated with a sensorless input object of each of the remaining plurality of users, the second image data comprising location and orientation data of the sensorless input object of each of the remaining plurality of users relative to the visual data;

projecting an image of the visual data and the second image data onto the display screen of the first user via a projector, the second image data being superimposed on the image of the visual data, the image of the visual data being common to the plurality of users; and coaxially combining at a beamsplitter an input of the IR filtered camera with an output of the IR light source and an output of the projector.

16. The method of claim 15, wherein at least one of the sensorless input object of the first user and the sensorless input object of each of the remaining plurality of users comprises a hand of the respective one of the plurality of users.

17. The method of claim 15, wherein projecting the second image data comprises projecting semi-transparent silhouette images of the sensorless input objects of the remaining plurality of users superimposed on the image of the visual data, each of the semi-transparent silhouette images being a distinct color that corresponds to the respective one of the remaining plurality of users.

18. The method of claim 15, further comprising automatically calibrating the image data based on the IR light and the IR filtered camera upon placing a predetermined pattern on the display screen.

19. The method of claim 15, further comprising:
determining gesture inputs associated with three-dimensional motion of the sensorless input object of the first user relative to the display screen; and
translating the gesture inputs into device control inputs.

20. The method of claim 15, wherein transmitting the first image data comprises one of transmitting the first image data on a wired network and wirelessly transmitting the first image data.

21. The method of claim 15, wherein receiving the second image data comprises one of receiving the second image data from a wired network, receiving the second image data from a wireless network, and receiving the second image data from a satellite.

22. A networked gesture collaboration system comprising a plurality of collaboration I/O systems at each of a respective plurality of remote locations, each of the plurality of collaboration I/O systems comprising:

an image system comprising at least one IR filtered camera and at least one IR light source coupled to the respective at least one IR filtered camera and being configured to obtain silhouette images of a sensorless input object to generate image data associated with a location and an orientation of the sensorless input object relative to a retroreflective display screen, wherein the image system associated with at least one of the plurality of collaboration I/O systems comprises a first IR filtered camera and a second IR filtered camera and a first and second IR light source coupled to the respective first and second IR cameras and being configured to determine gesture inputs based on the image data to provide simulated device inputs to the respective one of the plurality of collaboration I/O systems for interaction with visual data that is transmitted from one of the plurality of collaboration I/O systems designated as a master site to each other one of the plurality of collaboration I/O systems;

a transceiver configured to transmit the image data and simulated device input data associated with the simulated device inputs to each other one of the plurality of collaboration I/O systems and further configured to receive the image data and simulated device input data associated with the simulated device inputs from each other one of the plurality of collaboration I/O systems;

an image combiner configured to combine the image data and the simulated device input data from each of the plurality of collaboration I/O systems with the visual data;

a projector configured to project images of the sensorless input object and the simulated device inputs associated with each of the respective plurality of collaboration I/O systems superimposed over the visual data onto the retroreflective display screen; and wherein at least one of the plurality of collaboration I/O systems further comprises a beamsplitter configured to coaxially combine an input of the at least one IR filtered camera with an output of the respective at least one IR light source and an output of the projector.

* * * * *